H. A. BARBER.
Rotary-Pump.
No. 165,528. Patented July 13, 1875.
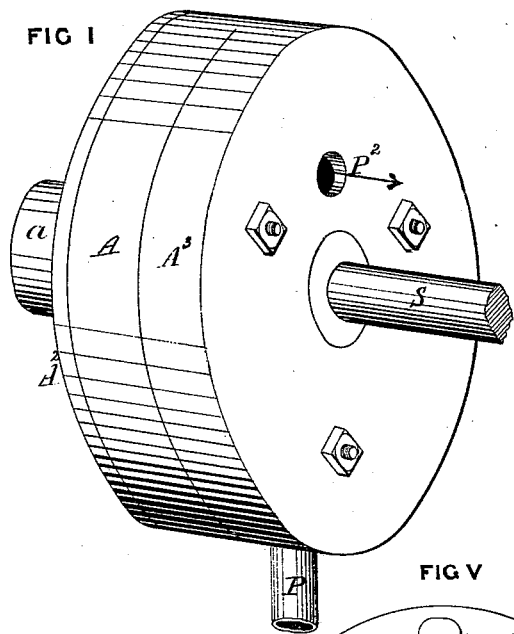
FIG I
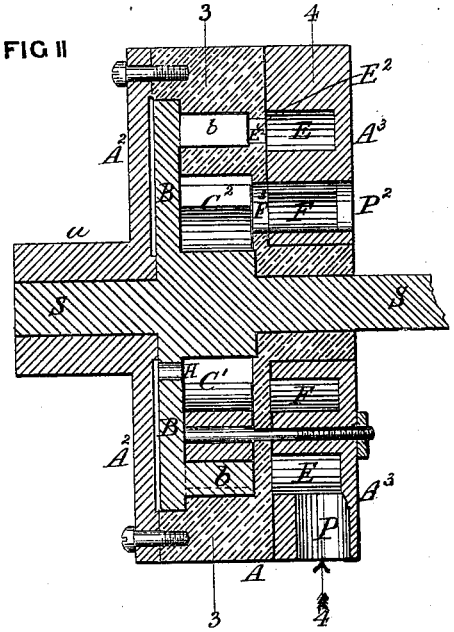
FIG II
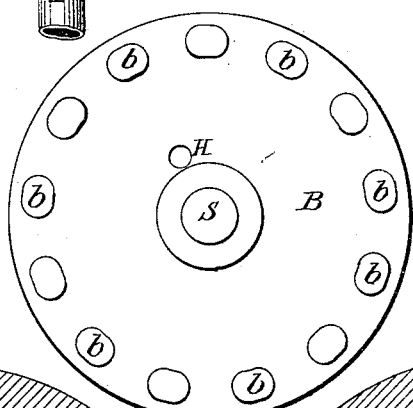
FIG V
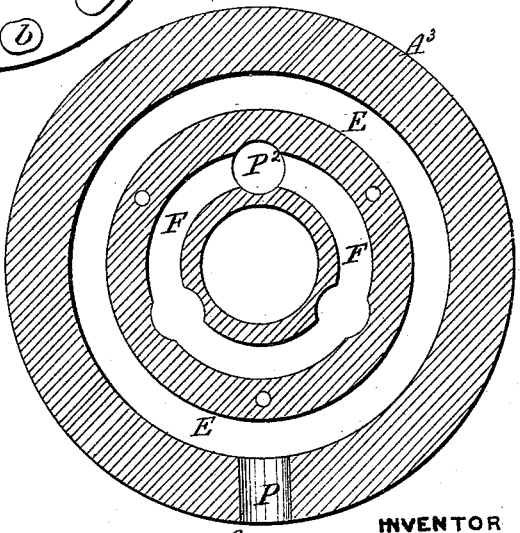
FIG III   FIG IV
WITNESSES
John E. Laing.
J. H. Rutherford
INVENTOR
Henry Ansel Barber
By Johnson and Johnson
his Attys.

UNITED STATES PATENT OFFICE.

HENRY A. BARBER, OF WATERTOWN, NEW YORK.

IMPROVEMENT IN ROTARY PUMPS.

Specification forming part of Letters Patent No. 165,528, dated July 13, 1875; application filed March 23, 1875.

*To all whom it may concern:*

Be it known that I, HENRY A. BARBER, of Watertown, in the county of Jefferson and State of New York, have invented certain new and useful Improvements in Rotary Pump; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This improved rotary pump is nearly or quite balanced, and runs with but little friction, while it is adapted to deliver a continuous stream, and works with little waste, although having no packing applied to the working parts. The valves are inclosed with and operated by the rotary piston.

The present invention consists, first, in the construction and employment of a peculiar form of piston, composed of a disk studded with arms or pins, which work in a circular channel or annular space, driving the water before them.

The invention consists, secondly, in rotating valves of peculiar construction, in combination with abutments. These valves, having wings with spaces between, which receive the water and transfer it from the pumping channel or chamber to the discharge chamber or passages.

The invention consists, thirdly, in the combination of a rotary piston, having arms or pins to form its effective surfaces, and winged rotary valves, (one or more,) driven by the intermeshing of such arms or pins therewith.

The invention consists, fourthly, in the combination, within a cylindrical case, of a rotary piston, having arms or pins to form its effective surfaces at or near its periphery; a circular pumping-channel and a coincident annular induction-passage connected therewith by ports; a concentric eduction-passage between the former and the shaft, connected with the center of the case, and rotary valves operated by the piston and carrying or directing the water inward to the center.

The invention consists, fifthly, in the combination of a case receiving the water at its periphery or edge, and discharging the same through its back, and a rotary piston perforated to admit water behind it to balance the pressure on its face, substantially as hereinafter specified.

Figure 1 is a perspective rear view of a rotary pump illustrating this invention. Fig. 2 is a vertical longitudinal section of the same. Fig. 3 is a vertical transverse section in the plane of the piston-valves on the line 3 3, Fig. 2. Fig. 4 is a vertical transverse section in the plane of the induction and eduction passages on the line 4 4, Fig. 2; and Fig. 5 view of the armed piston-disk.

A cylindrical case, A, incloses all the working parts and water-passages of this improved rotary pump, and consists, by preference, of a single-cored casting, beside the cap-plate $A^2$, and the chambered section or cap $A^3$. The latter is attached by bolts, and the joint is packed in usual manner. An axial aperture, formed in part in a hub, $a$, cast on the face of the cap-plate, receives and forms water-tight bearings for a driving-shaft, S, which receives rotary motion through a pulley and belt, or their equivalents, and carries a piston-disk, B, within the case. The effective surfaces of the piston are formed by projecting arms or pins $b$, with which the face of the disk is studded, the same being arranged near the periphery of the disk concentric with the shaft, and equidistant from each other. A circular water-chamber, closed by the cap-plate $A^2$, accommodates the piston B $b$ and valves $C^1$ $C^2$ $C^3$ to coact therewith. The piston-pins $b$ occupy and work within a circular channel, D. The pins are dressed to fit the channel snugly, and they operate in a positive manner to drive the water before them, or to carry it with and between them through the channel. The outer wall of this pumping-channel is that of the main water-chamber. Its inner wall is formed by solid segmental abutments G, with spaces between, within which the valves are mounted. The valves are rotary, being mounted on center pins or stationary shafts, and have wings adapted to engage with the piston-pins $b$, the spaces between the wings serving to receive the pins successively, as the valves are rotated by the piston, while the wings and spaces of the valve not thus occupied and moving inward operate to carry or direct the water from the pumping-channel toward the discharge. Each valve has four wings, which are faced true on their edges, and work against the outer wall of the pumping-channel and against a curved surface on the solid abutment behind which the valve is located, fitting at each point sufficiently tight to prevent the passage of water. A suction-pipe, P, leads through the periphery of the cylindrical case into a circular passage E, communicating with the pumping-channel D by three equidistant passages or ports, $E^1$ $E^2$ $E^3$. The water is discharged from the center of the case through eduction-ports $F^1$ $F^2$ $F^3$, a circular passage, F, into which these open, and a pipe, $P^2$, leading from this passage through the back of the case. A perforation, H, in the piston-disk admits water into a narrow space behind the same to equalize the pressure upon it, as shown in Fig. 2. By reason of the water entering the pumping-channel at three equidistant points, $E^1$ $E^2$ $E^3$, there is no unequal strain or wear on the shaft or its bearings, and the pressure of the water on the faces of the piston-disk being rendered equal or nearly so there is no end-long pressure or wear. The pressure of the water tends also to keep the rotary valves in close contact with the walls of the pumping-channel and the abutments. The water-passages of the pump are kept full at all times while it is at work, and a continuous or unbroken stream of water is maintained. The employment of three valves is not considered essential to the operation of the improved pump, as described. One or more may be used. The number of the pins or arms of the piston-disk is likewise unessential. The employment of a less or greater number is proposed, where either may be desirable.

Other similar modifications may be made without departing from this invention, which is not based on the number of parts or the mode of their manufacture.

From the foregoing it will be seen that the openings $E^1$ $E^2$ $E^3$ are inlets or suction ports, through which the water enters the circular channel D D D, and fills the spaces between the pins b as fast as they are vacated by the wings of the valves $C^1$ $C^2$ $C^3$. The spaces between the wings of the valves are also filled with water from openings $E^1$ $E^2$ $E^3$ as they disengage from the driving pins or pistons b, and pass in the rear of abutments G. As the valves rotate they carry the water past the abutments G toward the center and discharge the water at $F^1$ $F^2$ $F^3$. The water contained between the pins that revolve in the channel D is carried partly around said channel, and is forced out or displaced by the wings of the valves toward the center and out through the holes $F^1$ $F^2$ $F^3$, as shown by the arrows in Fig. 3.

It will be seen that the pins are always in contact with the outer wall of the channel D, and when a pin engages with a wing another wing on the same valve, and in advance of it, is in contact with the abutment; and as the movement of the wings on their centers is from the inlet before toward the outlet behind, and the movement of the pins is from any inlet toward the outlet in advance of the same, it is obvious that communication backward from that part of the chamber in which the pressure and outlet exist is always cut off from that part in which the suction and inlet are placed. Therefore the water from the inlet will follow both the pins onward to the outlet in advance, and the valves centerward to the outlet behind it.

The following is claimed as new, namely:

1. Rotary valves $C^1$ $C^2$ $C^3$, constructed with radial wings, and operating in combination with abutments G and the face-armed piston b B, substantially as herein set forth, to transfer the water from the pumping-chamber of a rotary pump to the discharge chamber or passages.

2. The rotary valves $C^1$ $C^2$ $C^3$, constructed as described, and combined with the face-studded piston B b, to intermesh as the piston revolves and effect the rotary motion of the valves, thereby avoiding by such intermeshing the necessity of outside connecting-gearing, substantially as herein set forth.

3. The combination, within the cylindrical case A, of the rotary piston B, having arms or pins b, the circular or pumping-channel D, the annular induction passage E, the inner concentric passage F for the discharge, and the rotary valves $C^1$ $C^2$ $C^3$ operated by the rotary piston, as specified.

4. The combination of a case, A, receiving the water at its periphery or edge and discharging the same at its back, and a rotary piston perforated to admit water behind it to equalize the pressure upon it, substantially as herein shown and described.

5. The water-wayed and cored casting A, in combination with the sleeved cap $A^2$, and the water-wayed cap $A^3$, to constitute the shell of the pump to receive the operating mechanism and to form the water-ways thereof, substantially as herein set forth.

6. The rotary valves and their abutments G, the piston B, and its effective surface arms b, combined for joint operation within the same chamber into which the water is pumped, and from which it is expelled, to render the pump more compact, substantially as described.

In testimony that I claim the foregoing as my own I have affixed my signature in presence of two witnesses.

HENRY ANSEL BARBER.

Witnesses:
WM. R. BAKER,
JNO. M. HOGAN.